United States Patent
Schuetzle et al.

(10) Patent No.: US 11,702,599 B2
(45) Date of Patent: *Jul. 18, 2023

(54) PROCESSES FOR THE PRODUCTION OF LIQUID FUELS FROM CARBON CONTAINING FEEDSTOCKS, RELATED SYSTEMS AND CATALYSTS

(71) Applicant: GREYROCK TECHNOLOGY, LLC, Sacramento, CA (US)

(72) Inventors: Robert Schuetzle, Sacramento, CA (US); Dennis Schuetzle, Grass Valley, CA (US)

(73) Assignee: Greyrock Technology, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/330,893

(22) Filed: Nov. 10, 2016

(65) Prior Publication Data

US 2018/0127659 A1    May 10, 2018

(51) Int. Cl.
*C10G 2/00*    (2006.01)
*B01J 21/04*   (2006.01)
(Continued)

(52) U.S. Cl.
CPC ............ *C10G 2/333* (2013.01); *B01J 21/04* (2013.01); *B01J 23/8913* (2013.01);
(Continued)

(58) Field of Classification Search
None
See application file for complete search history.

(56) References Cited

U.S. PATENT DOCUMENTS 2,546,017 A    3/1951   Schiller et al.
2,693,880 A   11/1954   Schoenfeld
(Continued)

FOREIGN PATENT DOCUMENTS

WO    WO 2004/069964 A1    8/2004

OTHER PUBLICATIONS

FisherScientific_gamma-Alumina, Mar. 2021, pp. 1-3 (Year: 2021).*
(Continued)

*Primary Examiner* — Medhanit W Bahta
(74) *Attorney, Agent, or Firm* — McKinney Law Group APC; Jeffrey A. McKinney

(57) ABSTRACT

The present invention is directed to unique processes, catalysts and systems for the direct production of liquid fuels (e.g., premium diesel fuel) from synthesis gas produced from natural feedstocks such as natural gas, natural gas liquids, carbon dioxide or other similar compounds or materials. In one aspect, the present invention provides a process for the production of a hydrocarbon mixture comprising the steps of: a) reducing a catalyst in-situ in a fixed bed reactor; b) reacting a feed gas that contains hydrogen and carbon monoxide with the catalyst to produce a hydrocarbon product stream, wherein the hydrocarbon product stream comprises light gases, a diesel fuel and a wax, and wherein the diesel fuel fraction is produced without requiring the hydroprocessing of wax, and wherein the catalyst comprises one or more metals deposited on a gamma alumina support at greater than about 5 weight percent, and wherein platinum or rhenium is included on the support in an amount ranging from about 0.01 weight percent and about 2 weight percent as a promoter, and wherein the catalyst has surface pore diameters between about 100 and 150 Angstroms, subsurface pore diameters between 10 and 30 Angstroms a crush strength greater than about 3 lbs./mm, a mean effective (Continued)

pellet radius less than about 600 microns, and a BET surface area greater than about 100 m²/g, and wherein the diesel fuel comprises more than about 70 percent $C_8$-$C_{24}$ hydrocarbons.

6 Claims, 2 Drawing Sheets

(51) Int. Cl.
*B01J 35/02* (2006.01)
*B01J 35/10* (2006.01)
*B01J 37/18* (2006.01)
*B01J 23/89* (2006.01)
*B01J 37/02* (2006.01)

(52) U.S. Cl.
CPC ........... *B01J 35/023* (2013.01); *B01J 35/026* (2013.01); *B01J 35/1019* (2013.01); *B01J 35/1061* (2013.01); *B01J 37/0201* (2013.01); *B01J 37/18* (2013.01); *C10G 2/332* (2013.01); *C10G 2400/02* (2013.01); *C10G 2400/04* (2013.01)

(56) References Cited

U.S. PATENT DOCUMENTS

| | | | |
|---|---|---|---|
| 3,444,256 | A | 5/1969 | Engelhard et al. |
| 4,326,995 | A | 4/1982 | Berg et al. |
| 4,495,307 | A | 1/1985 | Clements |
| 4,499,209 | A | 2/1985 | Hoek et al. |
| 5,229,347 | A | 7/1993 | Prada et al. |
| 5,620,670 | A | 4/1997 | Benham et al. |
| 6,262,131 | B1 | 7/2001 | Arcuri et al. |
| 7,404,936 | B2 | 7/2008 | Mazanec et al. |
| 8,394,862 | B1 * | 3/2013 | Schuetzle ............... C10G 2/332 518/700 |
| 9,090,831 | B2 * | 7/2015 | Schuetzle ............... C10G 2/33 |
| 2005/0166447 | A1 | 8/2005 | Corkwfi et al. |
| 2006/0144755 | A1 | 7/2006 | Renazzi et al. |
| 2008/0108716 | A1 | 5/2008 | Ayasse |
| 2009/0300970 | A1 | 12/2009 | Perego et al. |
| 2010/0160463 | A1 | 6/2010 | Wang et al. |
| 2010/0270506 | A1 * | 10/2010 | Goetsch ............... C10J 3/482 252/373 |
| 2012/0208902 | A1 | 8/2012 | Kresnyak et al. |
| 2013/0274093 | A1 * | 10/2013 | Woodfield ........... B01J 35/1061 502/177 |
| 2014/0250770 | A1 * | 9/2014 | Schuetzle ............... C10G 2/33 44/300 |
| 2014/0262965 | A1 | 9/2014 | Bauman et al. |
| 2015/0275097 | A1 | 10/2015 | Schuetzle et al. |

OTHER PUBLICATIONS

Homs, N. et al. "Modification of the surface acidity of gamma-alumina" J. Cat. 1984, 89, 531-532 (Year: 1984).*

Keyvanloo, K. et al. "Supported Iron Fischer-Tropsch Catalyst: Superior Activity and Stability Using a Thermally Stable Silica-Doped Alumina Support" ACS Catal. 2014, 4, 1071-1077 (Year: 2014).*

Karaca, H. et al. "Structure and catalytic performance of Pt-promoted alumina-supported cobalt catalysts under realistic conditions of Fischer-Tropsch synthesis" Journal of Catalysis, 277, 2011, 14-26) (Year: 2011).*

* cited by examiner

PROCESSES FOR THE PRODUCTION OF LIQUID FUELS FROM CARBON CONTAINING FEEDSTOCKS, RELATED SYSTEMS AND CATALYSTS

FIELD OF THE INVENTION

The present invention is directed to unique processes, catalysts and systems for the production of liquid fuels (e.g., premium diesel fuel) from synthesis gas produced from carbon containing feedstocks such as biomass (for example wood, agricultural wastes, other carbon containing materials), municipal solid wastes, natural gas, natural gas liquids, carbon dioxide, bio-gas, flare gas, associated gas or other similar carbon containing compounds or materials.

BACKGROUND OF THE INVENTION

There have been reports of the conversion of certain feedstocks into synthesis gas (or "syngas" which is a gas containing hydrogen and carbon monoxide) and the subsequent conversion of the syngas into fuels. For instance, U.S. Pat. No. 7,404,936 is allegedly directed to the following: "The present invention provides new micro-reactor systems, catalysts, and chemical processes. Methods of making novel catalysts and reaction apparatus are also described. In one aspect, the invention provides a method of conducting a reaction, comprising: flowing at least one reactant into a microchannel, and reacting at least one reactant in the presence of the graded catalyst within the microchannel to form at least one product. In this aspect, the microchannel includes a graded catalyst that substantially fills a cross section of the microchannel. The graded catalyst has a distribution of catalytically active material such that the at least one reactant is exposed to a higher concentration of catalytically active material in one area of the catalyst than in another area of the catalyst. As with all methods mentioned herein, the invention also includes apparatus for conducting these methods and systems that include the apparatus and reactants and/or products."

The abstract for U.S. Pat. No. 6,262,131 reports the following: "A Fischer-Tropsch catalyst for the conversion of synthesis gas into Fischer-Tropsch products includes a stationary Fischer-Tropsch catalyst having a voidage ratio greater than approximately 0.45 or 0.6 and may further have a catalyst concentration for a given reactor volume of at least 10 percent. A Fischer-Tropsch catalyst has a structured shape promoting non-Taylor flow and/or producing a productivity in the range of 200-4000 volume CO/volume Catalyst/hour or greater over at least a 600 hour run of a Fischer-Tropsch reactor with the catalyst therein. A system for converting synthesis gas into longer-chain hydrocarbon products through the Fisher-Tropsch reaction has a reactor for receiving synthesis gas directly or as a saturated hydrocarbon liquid or a combination, and a stationary, structured Fischer-Tropsch catalyst disposed within the reactor for converting at least a portion of the synthesis gas into longer-chain hydrocarbons through Fischer-Tropsch reaction. A Fischer-Tropsch reactor system having a structured Fischer-Tropsch catalyst may have an all-liquid saturated reactant feed, an all gas reactant feed, or a plethora of combinations in-between. The systems may or may not include heat removal devices. Methods of manufacturing catalysts and converting synthesis gas are also presented."

The abstract for U.S. Pat. No. 5,620,670 reports the following: "A process of converting a feed of hydrocarbon-containing gases into liquid hydrocarbon products including a first reaction of converting the feed into one to 2.5 parts of hydrogen to one part carbon monoxide in the presence of carbon dioxide and then secondly reacting the hydrogen and carbon monoxide in a Fischer-Tropsch synthesis reactor using a promoted iron oxide catalyst slurry to form liquid hydrocarbon products, wherein the carbon dioxide from the first and second reactions is separated from the product streams and at least a portion of the separated carbon dioxide is recycled into the first reaction feed."

The abstract for U.S. Pat. No. 4,499,209 describes the following: "The present invention therefore relates to a process for the preparation of a Fischer-Tropsch catalyst which contains cobalt, zirconium or titanium, and silica, which process comprises impregnating a silica carrier with a solution of a zirconium or titanium compound, calcining the composition thus obtained, impregnating the calcined composition with a solution of a cobalt compound, and calcining and reducing the composition thus obtained. The present patent application also relates to a process for the preparation of hydrocarbons by catalytic reaction of carbon monoxide with hydrogen, in which a $H_2$ and CO-containing feed is contacted at elevated temperature and pressure with a catalyst which comprises 5-40 parts by weight (pbw) of cobalt and 2-150 pbw of zirconium or titanium per 100 pbw of silica and which has been prepared by impregnating a silica carrier once or several times with a solution of a zirconium or titanium compound, calcining the composition thus obtained, impregnating the calcined composition once or several times with a solution of a cobalt compound and calcining and reducing the composition thus obtained."

Despite the various reports, there is still a need in the art for novel processes, catalysts and systems for the production of liquid fuels from carbon containing feedstocks, especially for systems that function at smaller scales than previously practiced for example including but not limited to systems at approximately smaller than 10,000 barrels per day of production and as small as 5 barrels per day of production. In order to achieve viable economics at plant scales at approximately less than 10,000 barrels per day a different approach to conversion of syngas into liquid fuels needs to be taken. In traditional Fischer-Tropsch (F-T), catalysts produce primarily heavy hydrocarbon wax from syngas. In order to produce liquid fuels from the wax, the wax must by refined/upgraded using hydrocracking and other hydro-processing techniques. Implementation of refining/upgrading hardware is too costly and complex for smaller, distributed plant scales and therefore a new system and catalyst is required to enable attractive economics at this scale.

BRIEF SUMMARY OF THE INVENTION

In one aspect, the present invention provides a catalytic process to directly produce diesel fuel from syngas in very high yields. In another aspect, the present invention provides a catalytic process to directly produce diesel fuel from syngas, where hydro-processing or other traditional upgrading steps (e.g. hydrocracking or hydro-isomerization) are not required. This process does require a significantly different catalyst and process than has been used in the past.

In another aspect, the present invention provides a catalytic process to directly produce diesel fuel from syngas. The system is operated to produce three non-gas streams including a gasoline blendstock fraction (approximately $C_4$-$C_7$), a diesel fuel fraction (about $C_8$-$C_{24}$ range), and a light solid wax fraction (about $C_{24}$+).

In another aspect, the present invention provides a catalytic process to directly produce primarily diesel fuel from syngas, where about two thirds or more of the produced liquid product is in the diesel fuel range, and where the majority of hydrocarbons in the diesel fuel range are $C_8$-$C_{24}$ hydrocarbons (e.g., >50 percent, >55 percent, >60 percent, >65 percent or >70 percent). The remainder of non-gas phase material consists of a light solid wax and a gasoline blendstock.

In another aspect, the present invention provides a catalytic process to directly produce diesel fuel from syngas, where the process includes the steps of reacting a feed gas (e.g., syngas, cleaned-up syngas, and others) with a supported catalyst to produce a product stream comprising diesel fuel, gasoline blendstock (where the diesel fuel and gasoline blendstock together are liquid products), gases and a solid wax. After the liquid product fraction is distilled, the distribution of product is about greater than ⅔ diesel fuel (e.g., about greater than 70 wt. percent, 75 wt. percent, or 80 wt. percent diesel fuel) and about less than ⅓ gasoline blendstock (e.g., about less than 30 wt. percent, 25 wt. percent, or 20 wt. percent gasoline blendstock).

In another aspect of the invention, out of the total non-gas components less than 10% and preferably less than 2% of the total are light wax products.

In another aspect, the present invention provides a catalytic process to directly produce primarily diesel fuel from syngas. There is at least one catalyst used in the catalytic process. The catalyst is typically a metal catalyst, and often times is cobalt, iron, nickel or a combination of the metals deposited at greater than 5 wt. percent on a support. In certain cases greater or equal to 10 wt. percent, 15 wt. percent or 20 wt. percent is deposited on a support. Non-limiting examples of such supports include gamma aluminates, silicates, zeolites, silica-aluminates, carbon and mordenites.

One or more promoters are usually included on the support along with the metal catalyst in an amount ranging from about 0.01 wt. percent to about 10 wt. percent based on the total weight of the supported catalyst. In certain cases the one or more promoters are included in an amount ranging from about 0.05 wt. percent to about 5 wt. percent, 0.1 wt. percent to about 3 wt. percent, or 0.2 wt. percent to about 2 wt. percent.

In another aspect, the present invention provides a catalyst for directly producing primarily diesel fuel from syngas. The catalyst typically includes a metal and a promoter included on a support. Non-limiting examples of promoters are cerium, lanthanum, gold, nickel, silver, and platinum group metals (including platinum, palladium, osmium, iridium, ruthenium, and rhodium) and combinations thereof. Oftentimes the catalyst has a mean pore diameter greater than about 8 nm. The catalyst may be of any suitable shape that allows for efficient operation in a catalyst bed. In certain cases, the catalyst is of one of the following shapes: lobed extrudate, a sphere, a granule. The lobed support frequently consists of three, four or five lobes, with two or more of the lobes being longer than the others—e.g., two longer lobes being symmetric and one, two or three of the shorter lobes being symmetric. The distance from the mid-point of the support or the mid-point of each lobe is called the "effective pellet radius".

In another aspect, the present invention provides a catalyst for directly producing primarily diesel fuel from syngas. One method used to produce the catalyst is impregnation, although any suitable method can be used.

In another aspect, the present invention provides a catalyst for directly producing primarily diesel fuel from syngas. The catalyst typically has an average surface pore diameter in the range of about 110-160 Angstroms or preferably in the range of 120-150 Angstroms and sub-surface pore diameters in the range of about 10-40 Angstroms or preferably in the range of 10-30 Angstroms.

In another aspect, the present invention has a mean effective pellet radius less than about 600 microns or less than about 575 microns or less than about 550 microns, a crush strength of greater than about 3 lbs./mm or greater than about 3.25 lbs./mm or greater than about 3.50 lbs./mm, and a BET surface area of greater than about 100 $m^2$/g or greater than about 125 $m^2$/g or greater than about 150 $m^2$/g or greater than about 175 $m^2$/g, and a dispersion value between about 3.0 percent and 5.0 percent or about 3.5 percent and 4.5 percent or about 4 percent.

In another aspect, the present invention provides a catalyst for directly producing primarily diesel fuel from syngas. The catalyst is typically a supported catalyst, and non-limiting examples of supports include: alumina, alumina/silica combinations, activated carbon, carbon nanotubes, carbon nanofibers, and zeolite-based supports.

In another aspect of the invention, the catalyst substrate surface is neutral or very close to being neutral (pH of about 7.0). The surface acidity of the catalyst substrate is measured by a colorimetric titration with n-propyl amine using a methyl red indicator in which a neutral surface is defined as one for which the surface acidity is less than about 0.25 millimole per gram. If the surface is acidic, the surface of the substrate is comprised primarily of OH groups. For example, if the substrate is alumina, the surface composition is Al—OH. If the surface of alumina is neutral, the surface composition has an Al—O—Al structure.

In another aspect of the invention, catalyst reaction water is produced along with fuels products wherein the catalyst reaction water does not contain detectable acids as are typically found in Fischer-Tropsch (Or F-T) water.

In another aspect, the present invention provides a catalytic process to directly produce diesel fuel from syngas in which the diesel fuel is the primary product. The process is conducted in a fixed bed reactor using an in-situ reduction process (the catalyst is reduced in the reactor).

In another aspect, the present invention provides diesel fuel produced using a catalytic process that directly produces it from syngas. This diesel fuel is ideal for blending with a petroleum diesel to improve its cetane content and reduce sulfur in the blended fuel. The diesel fuel has a lubricity ranging from about 200 micron to about 475 micron per ASTM D6079.

In another aspect, the present invention provides diesel fuel produced using a catalytic process that directly produces it from syngas. The diesel fuel is splash blended with a small percentage of cold flow improver such that it can meet specifications for neat fuel operation in cold climates.

DETAILED DESCRIPTION OF THE INVENTION

Figure 1:
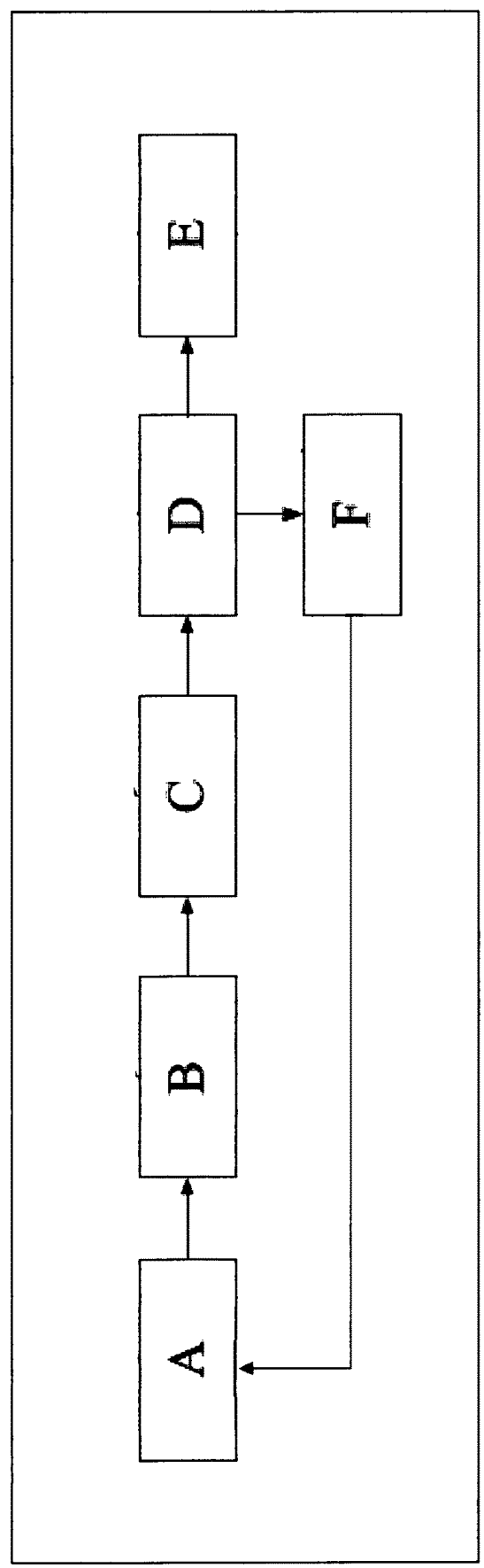
FIG. 1 shows a process flow diagram with Items A through E, each of which presenting different process steps from the production of syngas to processing a primarily diesel fuel.

The present invention provides a catalytic process that produces primarily diesel type fuels (which include a majority of $C_8$-$C_{24}$ hydrocarbons) with high selectivity, while minimizing wax (which includes a majority of $C_{24}$+ hydrocarbons) production using a unique catalyst and process. In this context, "selectivity" refers to moles of referenced fuel product formed per mole of CO converted.

The product from the catalytic process is typically a diesel type fuel or diesel type fuel blend-stock consisting of a majority of $C_8$-$C_{24}$ hydrocarbons, a $C_4$-$C_8$ gasoline blend-stock (the diesel fuel and gasoline blendstock are liquid fuels) and a minimal amount of solid wax ($C_{24}$+).

The diesel fuel or diesel blend-stock fraction that consists of hydrocarbons with a majority in the $C_8$-$C_{24}$ range is referred to as "diesel fuel". The process of the present invention typically produces a liquid fuel product distribution of about or greater than ⅔ diesel fuel and about or less than ⅓ gasoline blendstock.

The product of the present invention is typically a high cetane diesel type fuel or high cetane diesel type fuel blend-stock. In certain cases, the diesel fuel can be produced directly from syngas at high yields by passing the syngas through a reactor in a single pass by operating reactors in series to achieve a high overall carbon conversion. In other cases, unconverted syngas is recycled to the head of the reactor and blended with incoming feed gas.

Diesel fuel according to the present invention is liquid under ambient conditions (e.g., 72° F. and atmospheric pressure). The liquid hydrocarbon product produced from the F-T catalytic reaction can be used directly as a diesel blending stock or as a neat fuel without a need to employ costly refuting or upgrading processes. The blend-stock improves cetane number and reduces sulfur of typical petroleum derived diesel fuels. It also has superior lubricity properties and blending can improve the lubricity of petroleum derived fuels. In certain cases where the original feedstock from syngas production is renewable (e.g., derived from a bio-gas, biomass, carbon dioxide or other renewable feedstocks), the blend-stock provides a beneficial low carbon component when blended with petroleum derived fuels.

Product fractions from the catalytic process are separated using a series of condensers or "knock out vessels". In other F-T processes, a wax product is first condensed in a knock out vessel that is operated at 300° F. to 420° F. The liquid and water fractions are condensed in a second vessel at or below ambient conditions (100° F. or below).

In certain cases, distillation is used to produce the desired product cuts from direct effluent from the catalytic reaction. The distillation column may contain as few as 5 plates or as many as 40 plates, and it may be run at a variety of temperatures ranging to efficiently produce the desired fractions.

The present invention typically provides for the recycling of by-product streams such as naphtha and wax, which are gasified or reformed to produce additional syngas which is then subsequently used to produce more diesel fuel.

Processes according to the present invention often times include recycling tailgas back to the syngas generation unit whereby the syngas generation unit is a Steam Methane Reformer (SMR), and the tail gas is converted along with the primary feedstock (e.g., natural gas, natural gas liquids, or combinations thereof).

The processes, products and systems of the present invention provide several advantages. The diesel type fuels are ideal as current diesel fuel blend-stocks, as the blending improves cetane number, lowers fuel sulfur content and lowers engine emissions. They can be used as a neat fuel, as a blend, or can either be mildly isomerized or splash blended with a cold flow improver to meet specifications for low temperature climates.

Maximization of the $C_8$-$C_{24}$ selectivity for the diesel type fuel fraction allows elimination of costly upgrading processes for this fuel fraction. This enables the economic production of distributed gas to liquids plants that produce less than approximately 10,000 barrels of fuels per year. Much larger plants, however, are possible.

Referring to the drawings, FIG. 1 illustrates a schematic flow diagram with items A through E, each of which represents a different process step, starting with the production of a syngas feed to the processing of a diesel fuel.

In FIG. 1, item A refers to any process that produces a syngas feed, for example: indirect gasification, air or oxygen blown gasification, pyrolysis, plasma gasification, steam reforming, autothermal reforming, catalytic partial oxidation (CPDX), non-catalytic partial oxidation, dry reforming, or other methods known in the art.

Item B represents syngas cleanup and conditioning processes. Clean syngas, free of impurities that may affect catalyst performance and lifetime, is recommended for efficient and economical operation. Types of impurities include, without limitation, the following: hydrogen sulfide, ammonia, chlorides, and other contaminants that result from a syngas production process. Certain syngas cleanup processes are known in the art. For example, syngas cleanup processes can include sulfur clean-up catalysts, particulate filters and other technologies to produce clean syngas for subsequent conversion to fuels.

Item C represents the conversion of syngas into a product gas stream that results in a product mixture containing liquid fuels, light gases, and wax. The present invention includes the catalyst used in this process step and the corresponding operating conditions required for efficient operation during this process step.

Item D includes product separation processes, where the liquid and wax products are condensed out of the product gas stream, and the light gases are recycled back to the catalytic reactor and/or can be used for power production or other parasitic load requirements. In certain cases, Item D also includes condensing out the product gas stream into a product mixture comprising diesel, water and wax in a single knock out vessel; the wax typically stays entrained in the water fraction for ease of separation from the diesel fuel fraction.

Item E represents an optional, additional step, where a small percentage of a cold flow improver or other additives are blended into the diesel fuel fraction. This helps cold flow properties of the fuel for use in cold climates.

Item F represents an optional step where the remaining wax and/or the naphtha fraction can be recycled back to the syngas generation unit, allowing production of additional syngas from the wax and/or naphtha products. The naphtha and wax fractions are converted, in addition to the natural gas and/or natural gas liquids primary feedstocks, using a partial oxidation or gasification, or other syngas production system.

In fuel synthesis, which occurs in item C, hydrocarbon product selectivity depends on diffusion, reaction, and convection processes occurring within the catalyst pellets (i.e., supported catalyst) and reactor. "Catalyst pellets" or "supported catalyst" refer to a catalyst, typically a metal, dispersed on suitable support material or pellets. Characteristics of a supported catalyst that affect product distribution (e.g., the proportion of a diesel fuel and wax) include structural parameters, such as effective pellet radius and pore diameter of the support material, in addition to the operating conditions of the catalyst.

Figure 2:
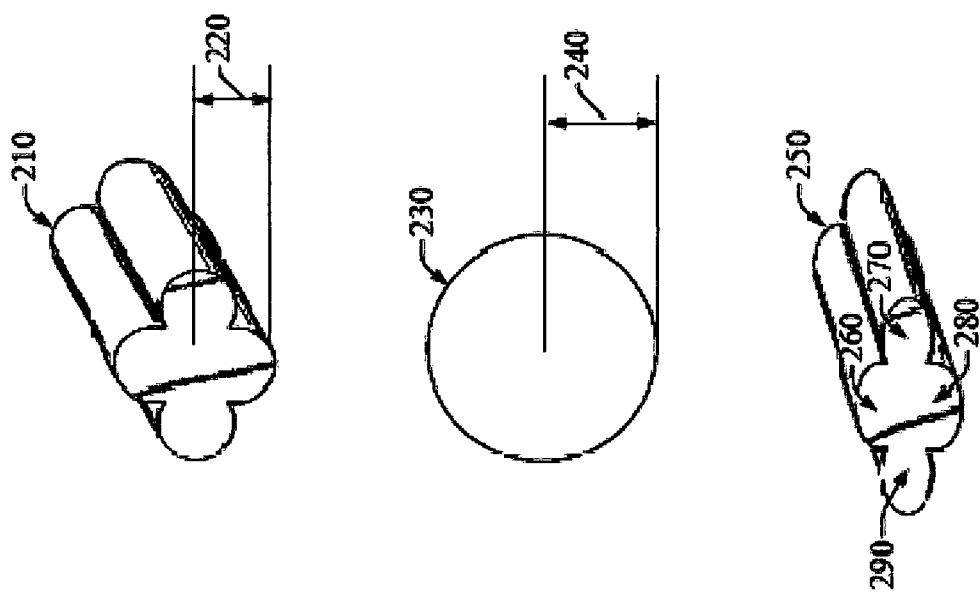
FIG. 2 shows the effective pellet radius of a lobed and a spherical support and also shows different sized lobes on the lobed catalyst.

FIG. 2 illustrates examples of pellet shapes (i.e., support or support materials), which may be used to support a catalyst in the syngas processing occurring in item C. FIG. 2 shows a lobed catalyst that may be used in certain aspects of the invention, although any suitable support material can be used.

The catalyst shape is typically an extrudate with a lobed, fluted or vaned cross section. In certain cases, however, it can be a sphere, granule, powder or any other support shape that allows efficient operation. The use of a lobed structure, for example, enables a significant increase in the ratio of area to volume in the catalytic reactor. This improves the volumetric efficiency of a catalytic reactor system. The lobed structures also provide an improved pressure drop, which translates into a lower difference in pressure both upstream and downstream of the catalyst bed, especially in fixed bed reactors.

FIG. 2 also illustrates how the effective pellet radius of a support material is defined. For a cylindrical support (230), the effective pellet radius is shown (240). For a lobed support (210), the effective pellet radius is shown (220).

"Effective pellet radius" of a pellet or support refers to the maximum radius, which is a distance from the mid-point of the support to the surface of the support. For lobed supports, "effective pellet radius" refers to the minimum distance between the mid-point and the outer surface portion of the pellet as shown. Typically, the effective pellet radius is about 600 microns or less. In certain cases, the effective pellet radius is about 300 microns or less.

The pellet or support material used in aspects of the present invention can be porous. The mean pore diameter of the support material usually has a mean pore diameter greater than about 80 angstroms. Occasionally, the mean pore diameter is greater than about 85 angstroms, 90 angstroms, 95 angstroms, 100 angstroms, 105 angstroms or 110 angstroms.

Any suitable material can be used as a support material in the process. Non-limiting examples of such materials include: metal oxides, such as alumina, silica, mesoporous silica, nonporous carbon, titania, zirconia, magnesium or combinations of these materials. Alumina is oftentimes used as the support material.

Catalytically active metals included with, or dispersed to, the support material promote the production of diesel fuel in the catalytic reaction. Non-limiting examples of such metals include: cobalt, hcp-crystalline cobalt, iron, $Fe_3O_4$, carbide phases of iron, nickel, or any combinations thereof, such as bimetallic Fe/Co. Any suitable particle size of the catalytically active metal can be used, for example between about 1 nm and 30 nm. Various promoters can also be added to the support material. Non-limiting examples of promoters are cerium, lanthanum, gold, nickel, and platinum group metals (including platinum, palladium, osmium, iridium, ruthenium, and rhodium).

The catalyst substrate surface is neutral or very close to being neutral (pH of about 7.0). This is an important chemical property since surface acidity significantly influences catalyst chemistry and the composition of the resulting products. The surface acidity of the catalyst substrate is measured by a colorimetric titration with n-propyl amine using a methyl red indicator in which a neutral surface is defined as one for which the surface acidity is less than about 0.25 millimole per gram.

Typically, the catalyst support has a crush strength between about 3 lbs./mm and about 4 lbs./mm and a BET surface area greater than about 100 $m^2/g$, greater than about 125 $m^2/g$ or greater than about 150 $m^2/g$. Conventional high surface area supports have an average pore diameters less than 100 angstroms.

Conventional supports having an average pore volume greater than 80 angstroms will have a surface area much lower than 150 $m^2/g$—usually less than 125 $m^2/g$ or less than 100 $m^2/g$—and crush strength below 2 lbs./mm. This is despite additional calcination or heat treatment. The present invention provides supports having a unique combination of properties through addition of a structural stabilizer that provides additional crystallinity and therefore more strength upon heat treatment.

Active metal distribution on the support is typically between about 2 percent and about 10 percent. In certain cases the active metal distribution is between about 2 percent and about 6 percent, or about 2.5 percent and about 5.5 percent, or about 3 percent and about 4 percent. "Active metal dispersion" refers to the fraction of atoms on the catalyst surface that are exposed, as expressed by the following formula: $D=N_S/N_T$, where D is the dispersion, $N_S$ is the number of surface atoms, and $N_T$ is the total number of atoms of the material. Dispersion increases with decreasing crystallite size.

In one case, a supported catalyst includes cobalt, iron or nickel deposited at between about 5 weight percent and 30 weight percent on gamma alumina, more typically about 20 weight percent on gamma alumina, based on the total weight of the supported catalyst. The supported catalyst further includes selected combinations of one or more promoters consisting of ruthenium, palladium, platinum, gold, nickel, rhenium and combinations thereof in an amount ranging from about 0.01 weight percent to about 20 weight percent, more typically ranging from about 0.1 weight percent to about 0.5 weight percent per promoter. The catalyst can be produced by impregnation or any other suitable technique known in the art.

Fischer-Tropsch supported catalysts are generally used in either a fixed bed or a slurry bed reactor. In a fixed bed reactor, the supported catalysts are packed within tubes, or they may be spread across a tray or packed into a number of channels, although any suitable fixed reactor design where the reaction gas is evenly distributed and flows over the catalyst in the bed. In one case, the catalyst is loaded in a multi-tubular, fixed bed reactor, with each tube in a shell design with a one inch diameter. The catalyst is typically reduced in-situ in the multi-tubular, fixed bed reactor at temperatures below 650° F. Fischer-Tropsch catalysts are generally reduced ex-situ (before loading into the reactor) at temperatures above 650° F. and can be as high as 850° F.

Operating parameters of the supported catalyst are selected to achieve the desired selectivity of diesel fuel. Pressures are typically kept between about 150 psi and 450 psi, or 200 psi and 450 psi, or 250 psi and 450 psi, or 300 psi and 450 psi, or 350 psi and 450 psi, or 375 psi and 425 psi. The reaction is usually operated at temperatures between about 350° F. and 460° F., or between about 375° F. and 435 or between 390° F. and 425° F., or about 410° F.

FIG. 2 also shows a lobed support with lobes of different sizes (250). Lobes marked as 270 and 290 denote the longer lobes, and lobes marked with 260 and 280 denote the shorter lobes. This type of support allows for more efficient catalyst bed packing, better pressure drop characteristics and high diesel fuel to wax production ratios using the present invention.

The diesel fuel fraction can optionally be further processed to improve its cold flow properties (e.g., cold pour properties). This optimizes the performance of diesel fueled vehicles in cold weather.

The diesel type fuel or diesel type fuel blend-stock of the present invention typically consists of a majority of $C_8$-$C_{24}$ hydrocarbons and a minimal amount of wax ($C_{24}$).

In certain cases, a cold flow improver can be blended with the diesel fuel fraction to improve cold flow properties of the diesel fuel. Cold flow improvers are typically added to a diesel fuel in an amount ranging from about 100 ppm to about 5,000 ppm to lower the pour point and freezing point properties. These pour point depressant typically consist of oil-soluble copolymers such as ethylene vinyl acetate copolymers (EVA), esters of styrene-maleic anhydride copolymers, polymethyl-methacrylate copolymers and alkyl-methacrylate copolymers.

Non-limiting Catalyst Structures

1. Metal: cobalt, deposited on a support at greater than about 5 weight percent; promoter: one or more platinum group metals, included in an amount ranging from about 0.01 weight percent to about 10 weight percent; support: gamma alumina; average pore diameter: greater than about 80 angstroms; crush strength: greater than about 3 lbs./mm; mean effective pellet radius: less than about 600 microns; BET surface area: greater than about 100 $m^2$/g.
2. Metal: cobalt, deposited on a support at greater than about 10 weight percent; promoter: one or more platinum group metals, included in an amount ranging from about 0.1 weight percent to about 3.0 weight percent; support: gamma alumina; average pore diameter: greater than about 80 angstroms; crush strength: greater than about 3.5 lbs./mm; BET surface area: greater than about 100 $m^2$/g.
3. Metal: cobalt, deposited on a support at greater than about 15 weight percent; gold included in an amount ranging from about 0.2 weight percent to about 2.0 weight percent; support: gamma alumina; average pore diameter: greater than about 80 angstroms; crush strength: greater than about 3.5 lbs./mm; BET surface area: greater than about 100 $m^2$/g.
4. The catalyst of "1", "2" or "3" above, where the support is silica.
5. The catalyst of "1", "2" or "3" above, where the support is mesoporous silica.
6. The catalyst of "1", "2" or "3" above, where the support is a nanoporous carbon support.
7. The catalyst of "1", "2" or "3" above, where the promoter includes gold in addition to the platinum group metals.
8. The catalyst of "1", "2" or "3" above, where the cobalt with an hcp crystalline structure.
9. The catalyst of "1", "2" or "3" above, where the cobalt has a particle size between about 1 nm and 30 nm.
10. The catalyst of "1", "2" or "3" above, where the catalyst has a dispersion value between about 3.5 percent and about 4.5 percent and an effective pellet radius less than about 600 microns.
11. Metal: iron, deposited on a support at greater than about 5 weight percent; promoter: rhenium, included in an amount ranging from about 0.01 weight percent to about 10 weight percent; support: gamma alumina; average pore diameter: greater than about 80 angstroms; crush strength: greater than about 3 lbs./mm; mean effective pellet radius: less than about 600 microns; BET surface area: greater than about 100 $m^2$/g.
12. Metal: iron, deposited on a support at greater than about 10 weight percent; promoter: rhenium, included in an amount ranging from about 0.1 weight percent to about 3.0 weight percent; support: gamma alumina; average pore diameter: greater than about 80 angstroms; crush strength: greater than about 3.5 lbs./mm; BET surface area: greater than about 100 $m^2$/g.
13. Metal: iron, deposited on a support at greater than about 15 weight percent; rhenium, included in an amount ranging from about 0.2 weight percent to about 2.0 weight percent; support: gamma alumina; average pore diameter: greater than about 80 angstroms; crush strength: greater than about 3.5 lbs./mm; BET surface area: greater than about 100 $m^2$/g.
14. The catalyst of "11", "12" or "13" above, where the support is silica.
15. The catalyst of "11", "12" or "13" above, where the support is mesoporous silica.
16. The catalyst of "11", "12" or "13" above, where the support is a nanoporous carbon support.
17. The catalyst of "11", "12" or "13" above, where the promoter is platinum or ruthenium rather than rhenium.
18. The catalyst of "11", "12" or "13" above, where the iron with is in the form of $Fe_3O_4$ or carbide phases.
19. The catalyst of "11", "12" or "13" above, where the iron has a particle size between about 1 nm and 30 nm.
20. The catalyst of "11", "12" or "13" above, where the catalyst has a dispersion value between about 3.5 percent and about 4.5 percent and an effective pellet radius less than about 600 microns.
21. Metal: bimetallic Fe/Co, deposited on a support at greater than about 5 weight percent; promoter: rhenium, included in an amount ranging from about 0.01 weight percent to about 10 weight percent; support: gamma alumina; average pore diameter: greater than about 80 angstroms; crush strength: greater than about 3 lbs./mm; mean effective pellet radius: less than about 600 microns; BET surface area: greater than about 100 $m^2$/g.
22. Metal: bimetallic Fe/Co, deposited on a support at greater than about 10 weight percent; promoter: rhenium, included in an amount ranging from about 0.1 weight percent to about 3.0 weight percent; support: gamma alumina; average pore diameter: greater than about 80 angstroms; crush strength: greater than about 3.5 lbs./mm; BET surface area: greater than about 100 $m^2$/g.
23. Metal: bimetallic Fe/Co, deposited on a support at greater than about 15 weight percent; ruthenium, included in an amount ranging from about 0.2 weight percent to about 2.0 weight percent; support: gamma alumina; average pore diameter: greater than about 80 angstroms; crush strength: greater than about 3.5 lbs./mm; BET surface area: greater than about 100 $m^2$/g.
24. The catalyst of "21", "22" or "23" above, where the support is silica.
25. The catalyst of "21", "22" or "23" above, where the support is mesoporous silica.
26. The catalyst of "21", "22" or "23" above, where the support is a nanoporous carbon support.
27. The catalyst of "21", "22" or "23" above, where the support is $TiO_2$.
28. The catalyst of "1", "2" or "3" above, where the bimetallic Fe/Co has a particle size between about 1 nm and 30 nm.
29. The catalyst of "1", "2" or "3" above, where the catalyst has a dispersion value between about 3.5 percent and about 4.5 percent and an effective pellet radius less than about 600 microns.

Non-limiting Process Parameters

30. A catalytic process to directly produce diesel fuel from syngas, where hydroprocessing or other upgrading steps are not required; a catalyst of "1", "2", "3", "4", "5", "6", "7", "8", "9", "10" above; pressures between about 150 psi and 450 psi; temperatures between about 350° F. and 460° F.
31. A catalytic process to directly produce diesel fuel from syngas, where hydroprocessing or other upgrading steps are not required; a catalyst of "11", "12", "13", "14", "15", "16", "17", "18", "19", "20" above; pressures between about 150 psi and 450 psi; temperatures between about 350° F. and 460° F.
32. A catalytic process to directly produce diesel fuel from syngas, where hydroprocessing or other upgrading steps are not required; a catalyst of "21", "22", "23", "24", "25", "26", "27", "28", "29", "30" above; pressures between about 150 psi and 450 psi; temperatures between about 350° F. and 460° F.
33. A catalytic process of "31", "32" or "33" above, where light wax is distilled as part of the integrated process, and the remaining wax fraction is recycled back to the syngas generation unit to produce additional syngas that is subsequently used to produce more diesel fuel.
34. A catalytic process of "31", "32" or "33" above, where the process does not include a step where oxygenates produced during the process are converted to corresponding paraffin's.
35. A catalytic process of "31", "32" or "33" above, where pressures are between about 200 psi and about 450 psi and temperatures are between about 375° F. and 435° F.
36. A catalytic process of "31", "32" or "33" above, where pressures are between about 250 psi and about 450 psi and temperatures are between about 390° F. and 425° F.

Non-limiting Product Compositions
37. Produced liquid fuel from a catalytic process of "31", "32", "33", "34", "35", "36", "37" or "38" above, where about two thirds or more of the produced liquid product is in the diesel fuel range, and where the more than 50 percent of hydrocarbons in the diesel fuel range are $C_8$-$C_{24}$.
38. Produced liquid fuel from a catalytic process of "31", "32", "33", "34", "35", "36", "37" or "38" above, where about two thirds or more of the produced liquid product is in the diesel fuel range, and where the more than 60 percent of hydrocarbons in the diesel fuel range are $C_8$-$C_{24}$.
39. Produced liquid fuel from a catalytic process of "31", "32", "33", "34", "35", "36", "37" or "38" above, where about two thirds or more of the produced liquid product is in the diesel fuel range, and where the more than 70 percent of hydrocarbons in the diesel fuel range are $C_8$-$C_{24}$.

Non-limiting Systems
40. A system for the production of diesel fuel using a catalytic process of "31", "32", "33", "34", "35", "36", "37" or "38" above, where the system can produce between about 1,000 barrels of diesel fuel to about 10,000 barrels of diesel fuel per day, where each barrel contains approximately 42 gallons of diesel fuel.
41. A system for the production of diesel fuel using a catalytic process of "31", "32", "33", "34", "35", "36", "37" or "38" above, where the system can produce between about 10,001 barrels of diesel fuel to about 25,000 barrels of diesel fuel per day, where each barrel contains approximately 42 gallons of diesel fuel.
42. A system for the production of diesel fuel using a catalytic process of "31", "32", "33", "34", "35", "36", "37" or "38" above, where the system can produce between about 25,001 barrels of diesel fuel to about 50,000 barrels of diesel fuel per day, where each barrel contains approximately 42 gallons of diesel fuel.
43. A system for the production of diesel fuel using a catalytic process of "31", "32", "33", "34", "35", "36", "37" or "38" above, where the system can produce between about 50,001 barrels of diesel fuel to about 100,000 barrels of diesel fuel per day, where each barrel contains approximately 42 gallons of diesel fuel.

EXAMPLE 1

Supported catalysts were prepared using an incipient wetness procedure whereby cobalt and promoter metals were impregnated on a gamma alumina, quad-lobed support that has a neutral surface (not acidic) with a mean effective pellet radius of 0.25 mm and a mean pore diameter of 130 Angstroms. The surface area of the catalyst was 110 $m^2/g$ as measured by a BET/$N_2$ physi-sorption technique. The crush strength of the catalyst was 4 lbs./mm. Drying and calcination steps were used in the production process to produce a catalyst with 20 wt. % cobalt and 0.3 wt. % platinum promoter. Following the production of the supported catalysts, the supported catalysts were loaded in a multi-tubular fixed bed reactor of a tube in shell design with 1" (2.54 cm) diameter tubes. The catalyst was reduced with hydrogen at 75 psig and at a temperature less than 650° F. which are operating conditions that can be achieved in a fixed bed reactor that can be manufactured inexpensively.

In an alternative embodiment, the catalyst was reduced with a syngas feed with a high $H_2$/CO ratio under the same conditions. Reduction with syngas (instead of $H_2$) reduces commercial operating costs, especially in remote areas where smaller, distributed plants are sited. While in-situ reduction is highlighted in this example, other reduction procedures, including ex-situ options, can be used.

Following reduction, the supported catalysts liquid fuel fraction and water fraction were separated out from the light hydrocarbon gases and unreacted CO and $H_2$ in a single knock out vessel at temperatures below 70° F. The separated liquid product fraction included a liquid fuel fraction on top and a water fraction. A separator vessel with an internal vane was used to separate the liquid fuel fraction from the water.

The catalyst system under these operating conditions produced a liquid fuel fraction that consisted of approximately ⅔ diesel fuel and ⅓ gasoline blendstock (following distillation). In the preferred embodiment described herein, the product was a diesel type fuel or diesel type fuel blend-stock consisting of majority of $C_8$-$C_{24}$ hydrocarbons. Out of the non-gas phase products a minimal amount of wax ($C_{24}$+) was produced whereby the wax produced was a light wax produced from this process is unique in that the wax was a light wax consisting of primarily $C_{24}$-$C_{40}$ hydrocarbons.

The diesel fuel was used as a diesel fuel blendstock providing petroleum derived diesel fuel with an improvement in cetane, reduction in sulfur, and in some cases (based on the method of syngas production) was used as a low carbon blendstock.

EXAMPLE 2

The cold flow properties of a diesel fuel fraction were improved by splash blending the diesel fuel fraction with a cold flow improver. The same catalyst system and processes were used as described above in Example #1. Following the catalyst synthesis process, the diesel fuel fraction was splash blended with a cold flow improver that was blended at 2000 ppm and consisted of alkyl-methacrylate copolymers.

The invention claimed is:

1. A process for the production of a liquid hydrocarbon mixture comprising the steps of:
producing syngas by indirect gasification, air blown gasification, oxygen blown gasification;
reacting the syngas with a catalyst to produce a hydrocarbon mixture and water that does not contain detectable acids, wherein the hydrocarbon mixture comprises liquid fuels and wax, and wherein the catalyst comprises hcp-crystalline cobalt deposited on an alumina support at greater than about 5 weight percent, and wherein the catalyst has a particle size, and wherein the catalyst particle size is between about 1 nm and 30 nm, and wherein platinum group metals are included on the support in an amount ranging from about 0.01 weight percent to about 2 weight percent as a promoter, and wherein the catalyst has surface pore diameters greater than about 100 Angstroms, sub-surface pore diameters less than about 30 Angstroms, a crush strength greater than about 3 lbs./mm, a mean effective pellet radius less than about 600 microns, and a BET surface area greater than about 100 $m^2/g$, and directly using the hydrocarbon mixture as a fuel without the hydroprocessing of wax.

2. The process of claim 1, wherein the catalyst is reduced in-situ with hydrogen at temperatures below 350° C.

3. The process of claim 1, wherein the catalyst support is neutral in which a neutral surface is defined as one for which the surface acidity is less than about 0.25 millimole per gram as measured by a colorimetric titration with n-propyl amine using a methyl red indicator.

4. The process of claim 1, wherein the liquid hydrocarbon mixture contains less than 10 percent weight of wax.

5. The process of claim 1, wherein the liquid hydrocarbon mixture contains less than 2 percent by weight of wax.

6. The process of claim 1, wherein the supported catalyst comprises a lobed support with four lobes and wherein two of the lobes are longer than the other two lobes.

* * * * *